3,585,065
URETHANE-SILOXANE PAINT AND
PAINTED PRODUCT
Olin B. Johnson, Livonia, Mich., assignor to Ford
Motor Company, Dearborn, Mich.
No Drawing. Filed Nov. 18, 1968, Ser. No. 776,764
Int. Cl. B44d *1/50;* C08f *11/04;* C08g *47/10*
U.S. Cl. 117—93.31
21 Claims

ABSTRACT OF THE DISCLOSURE

A radiation-curable, film-forming paint binder comprising in combination (a) an alpha-beta olefinically unsaturated diurethane and (b) an alpha-beta olefinically unsaturated siloxane. The former is formed by reacting an organic diisocyanate with a hydroxy ester of an alpha-beta olefinically unsaturated carboxylic acid. The latter is formed by reacting such an ester with a siloxane having at least two functional groups selected from hydroxyl groups and hydrocarbonoxy groups. The preferred hydroxyl bearing esters are monohydroxy esters of acrylic or methacrylic acid. Cinnamates and crotonates may also be used. The above referred to combination in some embodiments is of a suitable viscosity for undiluted application to a substrate. In other embodiments, the combination is applied in solution with vinyl monomers and/or olefinically unsaturated organic resins and/or volatile solvents which can be flashed off prior to curing. The binder solution is applied to a substrate as a liquid film and crosslinked thereon by an electron beam.

This invention relates to the art of coating and is concerned with paint and painted articles of manufacture wherein the painted surface combines both high resistance to abrasion and weathering. This invention is particularly concerned with articles of manufacture having external surfaces of wood, metal, or synthetic polymeric solid coated with an in situ formed polymerization product of a radiation-curable paint binder crosslinked on such surface by ionizing radiation and comprising a film-forming solution of (a) an alpha-beta olefinically unsaturated organic diurethane, and (b) an alpha-beta olefinically unsaturated siloxane. The siloxane component is formed by reacting a siloxane having at least two functional groups selected from hydroxyl groups and hydrocarbonoxy groups with a hydroxyl bearing ester of an alpha-beta olefinically unsaturated carboxylic acid, preferably at least two molar parts of the ester with one molar part of the siloxane. The diurethane monomer is formed by reacting such esters with an organic diisocyanate, preferably two molar parts of the ester with one molar part of the diisocyanate.

In this application, the term "paint" is meant to include pigment and/or finely ground filler, the binder without pigment and/or filler or having very little of the same, which can be tinted if desired. Thus, the binder which is ultimately converted to a durable film resistant to weathering, can be all or virtually all that is used to form the film, or it can be a vehicle for pigment and/or particulate filler material.

The siloxanes employed in the preparation of the binder have a reactive hydroxyl or hydrocarboxy group bonded to at least two of its silicon atoms. The term "siloxane" as employed herein refers to a compound containing a

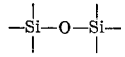

linkage, with the remaining valences being satisfied by a hydrocarbon radical, a hydrocarbonoxy group, hydrogen, a hydroxyl group, or an oxygen atom which interconnects the silicon atom providing such valence with another silicon atom.

The acyclic siloxane molecules which can be used in preparing paint binder components of this invention advantageously contain about 3 to about 18 silicon atoms per molecule with corresponding oxygen linkages. The preferred siloxanes are represented by the following general formula:

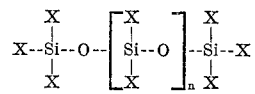

wherein $n$ is a least 1 and X is (a) a $C_1$ to $C_8$ monovalent hydrocarbon radical, preferably a $C_1$ to $C_4$ alkyl radical, or (b) $C_1$ to $C_8$ monovalent hydrocarbonoxy radical, preferably a $C_1$ to $C_4$ alkoxy radical, or (c) a hydroxyl radical, or (d) hydrogen, with at least two of the X groups separated by a

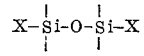

linkage being either (b) or (c).

The cyclic siloxanes which can be used in preparing paint binder components of this invention contain at least 3, preferably 6 to 12, and ordinarily not more than 18, silicon atoms per molecule with corresponding oxygen linkages. The cyclic polysiloxanes used may take the form of one of the following type formulas:

(I)
$$X_{n'}Si_nO_{n''}$$

where
$n$=an odd numbered positive integer of at least 3,
$n'=2n$, and
$n''=n$
X=
(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

linkage being either (b) or (c)
exemplified by the following formula:

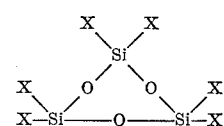

(II) $$X_{n'}Si_nO_{n''}$$
where
$n$=an odd numbered positive integer of at least 5,
$n'=n+3$, and
$n''=6, 6+3$ or $6+$a multiple of 3
X=
(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or (d) hydrogen—with at least two of the X groups separated by a

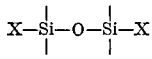

linkage being either (b) or (c)

exemplified by the following structural formula:

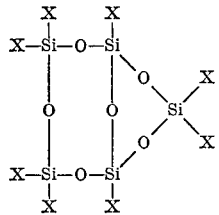

(III) $\quad X_{n'}Si_nO_{n''}$ where $n=6$ or a multiple of 6,
$n'=8$, $8+6$, or $8+$a multiple of 6
$n''=8$, $8+9$, or $8+$a multiple of 9
X=
(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxy radical, or
(d) hydrogen—with at least two of the X groups separated by

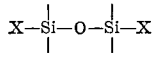

linkage being either (b) or (c)

exemplified by the following structural formula:

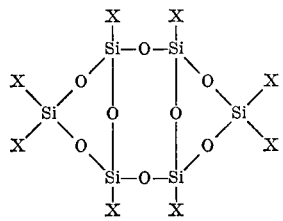

or a condensation dimer, trimer, etc., thereof formed with loss of water or alcohol.

(IV) $\quad X_{n'}Si_nO_{n''}$ where $n=$an even numbered positive integer of at least 4,
$n'=n+4$, and
$n''=4$, $4+3$, or $4+$a multiple of 3
X=
(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

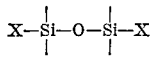

linkage being either (b) or (c)

exemplified by the following structural formula:

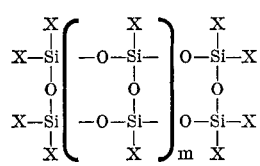

where $m$ is 0 or a positive integer.

(V) $\quad X_{n'}Si_nO_{n''}$ where $n=$an even numbered positive integer of at least 8,
$n'=n+2$, and
$n''=11$, $11+3$, or $11+$a multiple of 3
X=
(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

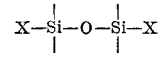

linkage being either (b) or (c)

exemplified by the following structural formula:

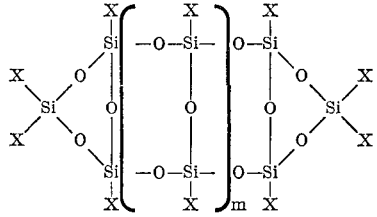

where $m$ is a positive integer.

A variety of methods are known to the art for preparing siloxanes. These include controlled hydrolysis of silanes, polymerization of a lower molecular weight siloxane, reacting silicon tetrachloride with an alcohol, etc. The preparation of siloxanes and their incorporation into organic resins is disclosed in U.S. Pats. 3,154,597; 3,074,904; 3,044,980; 3,044,979; 3,015,637; 2,996,479; 2,973,287; 2,937,230; and 2,909,549.

The hydroxyl bearing ester is preferably a monohydroxy alkyl ester of an alpha-beta olefinically unsaturated monocarboxylic acid. The preferred hydroxy esters are acrylates and methacrylates in that they provide olefinic unsaturation between the terminal carbon atoms and are readily polymerizable at relatively low doses of ionizing radiation. A partial and exemplary list of such acrylates follows:

2-hydroxyethyl acrylate or methacrylate
2-hydroxypropyl acrylate or methacrylate
2-hydroxybutyl acrylate or methacrylate
2-hydroxyoctyl acrylate or methacrylate
2-hydroxydodecanyl acrylate or methacrylate
2-hydroxy-3-chloropropyl acrylate or methacrylate
2-hydroxy-3-acryloxypropyl acrylate or methacrylate
2-hydroxy-3-methacryloxypropyl acrylate or methacrylate
2-hydroxy-3-allyloxypropyl acrylate or methacrylate
2-hydroxy-3-cinnamylpropyl acrylate or methacrylate
2-hydroxy-3-phenoxypropyl acrylate or methacrylate
2-hydroxy-3-(o-chlorophenoxy)propyl acrylate or methacrylate
2-hydroxy-3-(p-chlorophenoxy)propyl acrylate or methacrylate
2-hydroxy-3-(2,4-dichlorophenoxy)propyl acrylate or methacrylate
2-hydroxy-3-acetoxypropyl acrylate or methacrylate
2-hydroxy-3-propionoxypropyl acrylate or methacrylate
2-hydroxy-3-chloroacetoxypropyl acrylate or methacrylate
2-hydroxy-3-dichloroacetoxypropyl acrylate or methacrylate
2-hydroxy-3-trichloroacetoxypropyl acrylate or methacrylate
2-hydroxy-3-benzoxypropyl acrylate or methacrylate 2-hydroxy-3-(o-chlorobenzoxy)propyl acrylate or methacrylate
2-hydroxy-3-(p-chlorobenzoxy)propyl acrylate or methacrylate
2-hydroxy-3-(2,4-dichlorobenzoxy)propyl acrylate or methacrylate
2-hydroxy-3-(3,4-dichlorobenzoxy)propyl acrylate or methacrylate
2-hydroxy-3-(2,4,6-trichlorophenoxy)propyl acrylate or methacrylate
2-hydroxy-3-(2,4,5-trichlorophenoxy)propyl acrylate or methacrylate
2-hydroxy-3-(o-chlorophenoxyacetoxy)propyl acrylate or methacrylate
2-hydroxy-3-phenoxyacetoxypropyl acrylate or methacrylate
2-hydroxy-3-(p-chlorophenoxyacetoxy)propyl acrylate or methacrylate
2-hydroxy-3-(2,4-dichlorophenoxyacetoxy)propyl acrylate or methacrylate
2-hydroxy-3-(2,4,5-trichlorophenoxyacetoxy)propyl acrylate or methacrylate
2-hydroxy-3-crotonoxypropyl acrylate or methacrylate
2-hydroxy-3-cinnamyloxypropyl acrylate or methacrylate
3-acryloxy-2-hydroxypropyl acrylate or methacrylate
3-allyloxy-2-hydroxypropyl acrylate or methacrylate
3-chloro-2-hydroxypropyl acrylate or methacrylate
3-crotonoxy-2-hydroxypropyl acrylate or methacrylate In addition to acrylates and methacrylates one may also use cinnamates, crotonates, etc.

The alpha-beta unsaturated, dialkenyl, diurethanes are prepared by reacting an organic diisocyanate with a hydroxy ester of the same type as that used in preparation of the aforedescribed alpha-beta olefinically unsaturated siloxane including those esters hereinbefore listed. Further information as to such reaction products is set forth by Fekete et al. in U.S. Pat. 3,297,745.

Among the diisocyanates which can be used are 2,4-tolylene diisocyanate,
2,6-tolylene diisocyanate,
1,3-xylylene diisocyanate,
1,4-xylylene diisocyanate,
1,5-naphthalene diisocyanate,
m-phenylene diisocyanate,
p-phenylene diisocyanate,
hexamethylene diisocyanate,
3,3'-dimethyl-4,4'-diphenylmethane diisocyanate,
4,4'-diphenylmethane diisocyanate,
3,3'-dimethylbiphenylene diisocyanate,
4,4'-biphenylene diisocyanate,
3,3'-dimethoxy-4,4'-dimethyl-4,4'-biphenylene diisocyanate,
durene diisocyanate,
1-phenoxy-2,4'-phenylene diisocyanate,
1-tert-butyl-2,4-phenylene diisocyanate, etc.

In special applications it may be advantageous to utilize one of the halogenated diisocyanates, e.g. 1-chloro-2,4-phenylene diisocyanate.

The alpha-beta olefinically unsaturated ester is preferably added to the diisocyanate incrementally with continuous stirring. The ester may be in solution with an inert solvent and the reaction mixture is preferably maintained in an inert atmosphere, e.g. nitrogen, while the reaction is carried out. The addition is preferably carried out at a rate such that the resulting exotherm does not exceed about 32° C. The resultant reaction is between the —NCO groups of the diisocyanate and the —OH group of the hydroxy esters leaving the alpha-beta unsaturation unreacted. The reaction is exothermic and self-generating. The use of an excess amount of the ester is advisable.

The term "ionizing radiation" as employed herein means radiation having sufficient energy to effect polymerization of the paint films herein disclosed, i.e., energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece where the intervening space is occupied by air. Adjustment can be made for the relative resistance of the intervening gas which is preferably an oxygen-free inert gas such as nitrogen or helium. I prefer to employ an electron beam which at its source of emission has average energy in the range of about 150,000 to about 500,000 electron volts.

The films formed from the paints of this invention are advantageously cured at relatively low temperatures, e.g. between room temperature (20° to 25° C.) and the temperature at which significant vaporization of its most volatile component is initiated, ordinarily between 20° and 70° C. The radiation energy is applied at dose rates of about 0.1 to about 100 Mrads per second upon a preferably moving workpiece with the coating receiving a total dose in the range of about 0.5 to about 100, ordinarily between about 1 and about 25, and most commonly between 5 and 15 Mrads. The films can be converted by the electron beam into tenaciously bound, wear and weather resistant, coatings.

The abbreviation "Mrad" as employed herein means 1,000,000 rads. The term "Rad" as employed herein means that dose of radiation which results in the absorption of 100 ergs of energy per gram of absorber, e.g. coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛ inch in diameter at this point, is then scanned to make a fan-shaped beam and then passed through a metal window, e.g. a magnesium-thorium alloy, aluminum, an alloy of aluminum and a minor amount of copper, etc., of about 0.003 inch thickness.

The term 'vinyl monomers" as used herein refers to a monomeric compound having a

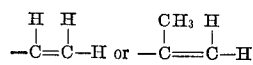

terminal group and excludes allylic compounds. The preferred vinyl monomers are esters of $C_1$ to $C_8$ monohydric alcohols and acrylic or methacrylic acid, e.g. ethyl acrylate, ethyl methacrylate, butyl acrylate, butyl methacrylate, octyl acrylate, 2-ethyl hexyl acrylate, etc. Alcohols of higher carbon number, e.g. $C_9$–$C_{15}$, can also be used to prepare such acrylates and methacrylates. Vinyl hydrocarbon monomers, e.g. styrene and alkylated styrenes such as vinyl toluene, alpha-methyl styrene, etc., may be used separately or in combination with acrylates and methacrylates. Also in combination with acrylates and methacrylates and/or vinyl hydrocarbon monomers, there may be used minor amounts of other vinyl monomers such as nitriles, e.g. acrylonitrile, acrylamide, N-methylol acrylonitrile, vinyl halides, e.g. vinyl chloride, and vinyl carboxylates, e.g. vinyl acetate.

The film-forming material should have an application viscosity low enough to permit rapid application to the substrate in substantially even depth and high enough so that at least 1 mil (.001 inch) film will hold upon a vertical surface without sagging. Such films will be ordinarily applied to an average depth of about 0.1 to 4 mils with appropriate adjustment in viscosity and application technique. It will be obvious to those skilled in the art that the choice of siloxane and of hydroxy esters in preparing the alpha-beta olefinically unsaturated siloxane component of the binder solution can be varied so as to vary the viscosity of the siloxane component. Likewise, the choice of diisocyanate and the esters reacted therewith can be utilized to vary the viscosity of the diurethane and hence of the binder solution. Also, the type and quantity of vinyl monomers used in the binder solution can be selected to adjust the viscosity of the binder solution to provide a proper consistency for application by conventional paint application techniques, e.g. spraying, roll coating, etc. In other applications, the use of alpha-beta olefinically unsaturated resins in the binder, e.g. polyesters, vinyl resins, epoxy resins, etc., will affect the viscosity of the binder. It is also within the scope of this invention to reduce the viscosity of the polymerizable binder with volatile solvents, e.g. xylene, toluene, methyl ethyl ketone, etc., which can be flashed off prior to curing.

The alpha-beta olefinically unsaturated siloxane-unsaturated ester product and the alpha-beta olefinically unsaturated diisocyanate-unsaturated ester product are both homopolymerizable and copolymerizable with each other, with vinyl monomers, and with alpha-beta olefinically unsaturated organic resins.

In a first embodiment, the sole polymerizable components of the binder are the siloxane-unsaturated ester product and the diisocyanate-unsaturated ester product. In this embodiment, the binder, exclusive of solvents, contains about 20 to about 80, preferably about 30 to about 70, parts by weight of siloxane-unsaturated ester product and about 20 to about 80, preferably about 30 to about 70, parts by weight of the diisocyanate-unsaturated ester product.

In a second embodiment, the binder solution contains as polymerizable components vinyl monomers in addition to the polymerizable components of the first embodiment. In this embodiment, the binder solution contains about 10 to about 200, preferably about 20 to about 80, parts by weight vinyl monomers, about 20 to about 80, preferably about 30 to about 70, parts by weight of the siloxane-unsaturated ester product, and about 20 to about 80, preferably about 30 to about 70, parts by weight of the diisocyanate-unsaturated ester product.

In a third embodiment, the binder solution contains as polymerizable components an alpha-beta olefinically unsaturated organic resin in addition to the alpha-beta olefinically unsaturated siloxane and the alpha-beta olefinically unsaturated diurethane. In this embodiment, the olefinically unsaturated resin consists essentially of carbon, hydrogen and oxygen and has an average molecular weight above about 500 and below about 25,000, preferably in the range of about 1,000 to about 15,000. In this embodiment, the binder contains about 20 to about 80, preferably about 30 to about 70, parts by weight of the alpha-beta olefinically unsaturated resin, about 20 to about 80, preferably about 30 to about 70, parts by weight of the siloxane-unsaturated ester product, and about 20 to about 80, preferably about 30 to about 70, parts by weight of the diisocyanate-unsaturated ester product.

In a fourth embodiment, the binder solution contains all four of the aforementioned polymerizable components. In this embodiment, the binder solution contains about 10 to about 300, preferably about 20 to about 200, parts by weight vinyl monomers, about 20 to about 80, preferably about 30 to about 70, parts by weight of the alpha-beta olefinically unsaturated organic resin or resins, about 20 to about 80, preferably about 30 to about 70, parts by weight of the siloxane-unsaturated ester product, and about 20 to about 80, preferably about 30 to about 70, parts by weight of the diisocyanate-unsaturated ester product. Minor amounts of other polymerizable monomers, e.g. allylic compounds, may be used to make up the balance, if any.

This invention will be more fully understood from the following illustrative examples:

EXAMPLE 1

A radiation-curable paint is prepared from the following components in the manner hereinafter set forth:

(a) Preparation of the siloxane-unsaturated ester component

Reactants: Parts by weight
Methoxy functional acyclic siloxane [1] _____ 178
Hydroxyethyl methacrylate _____ 118
Tetraisopropyl titanate _____ 0.32
Hydroquinone _____ 0.06

[1] A commercially available methoxylated partial hydrolysate of monophenyl and phenylmethyl silanes (largely condensed dimethyltriphenyltrimethoxytrisiloxane) and has the following typical properties:
Average molecular weight _____ 750–850
Average number of silicon atoms per molecule ___ 5–6
Average number of methoxy groups per molecule _ 3–4

Procedure.—The siloxane, the methacrylate monomer and hydroquinone polymerization inhibitor are heated to 100° C. in a flask fitted with a Barrett type distillation receiver. The titanate catalyst is added and the temperature is raised to 150° C. over a three hour period during which time methanol is removed by distillation. The cooled reaction product has a viscosity of 0.6 stoke at 25° C.

(b) Preparation of the diisocyanate-unsaturated ester component

Reactants: Parts by weight
2-hydroxyethyl methacrylate _____ 44.08
Tolylene diisocyanate monomer mixture [1] ___ 27.00

[1] 80% 2,4-tolylene diisocyanate; 20% 2,6-tolylene diisocyanate.

Procedure.—The diisocyanate is added dropwise to the methacrylate while stirring in a nitrogen gas atmosphere: A rate of addition is maintained so that the exotherm does not exceed 32° C. Stirring is continued for an hour after addition is completed, and the mixture allowed to stand for 16 hours at room temperature.

(c) Preparation of the paint binder solution

Copolymerizable components: Parts by weight
Siloxane-unsaturated ester product of (a) _____ 25
Diisocyanate-unsaturated ester product of (a) __ 75

The polymerizable reactants in solution with xylene are applied to a metal substrate to an average depth of about 1 mil. The xylene is flashed off and the coating is cross-linked upon the surface of the substrate by exposing the coating to an electron beam. The conditions of irradiation are as follows:

Electron beam potential _____kv.___ 295
Electron beam current _____ma.___ 25
Dose _____Mrads__ 15
Atmosphere _____ $N^2$

EXAMPLE 2

The procedure of Example 1 is repeated using 75 parts by weight of the siloxane-unsaturated ester product and 25 parts by weight of the diisocyanate-unsaturated ester product.

EXAMPLE 3

The procedure of Example 1 is repeated using 50 parts by weight of the siloxane-unsaturated ester product, 25 parts by weight of the diisocyanate-unsaturated ester product, and 50 parts by weight of an equimolar mixture of styrene and methyl methacrylate while omitting the xylene. The film is applied to metal, wood, and synthetic polymeric substrates, i.e. ABS—acrylonitrile-butadiene-styrene copolymer. The film is applied to an average depth of about 1.2 mils and is cured by exposing it to an electron beam using the conditions of Example 1 and continuing the irradiation until a tack-free film is formed.

EXAMPLE 4

The procedure of Example 1 is repeated using 25 parts by weight of the siloxane-unsaturated ester product, 50 parts by weight of the diisocyanate-unsaturated ester product, and 50 parts by weight of a vinyl monomer mixture of alpha-methyl styrene, ethyl acrylate and butyl methacrylate while omitting the xylene. The film is applied to metal, wood and synthetic polymeric substrates, i.e. ABS—acrylonitrile-butadiene-styrene copolymer. The film is applied to an average depth of about 1.2 mils and is cured by exposing it to an electron beam using the conditions of Example 1 and continuing the irradiation until a tack-free film is formed.

EXAMPLE 5

The procedure of Example 1 is repeated using 50 parts by weight of the siloxane-unsaturated ester product, 50 parts by weight of the diisocyanate-unsaturated ester product, and 50 parts by weight of a vinyl monomer mixture of methyl methacrylate, butyl acrylate and 2-ethyl hexyl acrylate while omitting the xylene. The film is applied to the same substrates as in the preceding example to an average depth about 0.8 mil and is cured by exposing it to an electron beam using the conditions of Example 1 and continuing the irradiation until a tack-free film is formed.

EXAMPLE 6

The procedure of Example 1 is repeated using 50 parts by weight of the siloxane-unsaturated ester product, 50 parts by weight of the diisocyanate-unsaturated ester product, 50 parts by weight of methyl methacrylate, and 50 parts by weight of an alpha-beta olefinically unsaturated polyester resin while omitting the xylene. The film-forming solution is applied to the aforementioned substrates to an average depth of about 1.5 mils and cross-linked thereon by exposing the film to an electron beam using the conditions of Example 1 and continuing the irradiation until a tack-free film is formed.

The alpha-beta olefinically unsaturated resin used in this example is prepared as follows:

| Starting materials: | Parts by weight |
|---|---|
| Maleic anhydride | 147 |
| Phthalic anhydride | 429 |
| Neopentyl glycol | 503 |

Procedure.—All of the reactants are charged to a four neck flask fitted with a stirrer, a thermometer, a nitrogen inlet tube and a ten inch vigreaux column topped with a Barrett trap for removing the water of condensation. The reactants are slowly heated to 165° C. at which time the first water of condensation distills off. Nitrogen is bubbled through the reactants throughout the reaction. The reaction temperature rises as water is continually removed until a maximum temperature of 225° C. is attained. The column is then removed from the system, 3 wt. percent xylene is added to aid azeotropic water removal and heating is continued until the acid number reaches 30. The product is cooled to 100° C. and 0.03 wt. percent hydroquinone inhibitor is added and the polymer diluted to 80% non-volatile content with styrene.

EXAMPLE 7

The procedure of Example 6 is repeated except that the alpha-beta olefinically unsaturated resin is a copolymer of vinyl monomers. This resin is prepared in the following manner:

| Starting materials: | Parts by weight |
|---|---|
| Xylene | 600 |
| Methyl methacrylate | 196 |
| Ethyl acrylate | 333 |
| Glycidyl methacrylate | 71 |
| Azobisiso butyronitrile | 6 |
| Hydroquinone | 0.12 |
| Methacrylic acid | 42 |
| Triethyl amine | 0.96 |

Procedure.—The reaction solvent, xylene, is charged to a flask fitted with a stirring rod, an addition funnel, a thermometer, a nitrogen inlet tube and a condenser. The amount of xylene is equal to the total weight of vinyl monomers to be added. The xylene is heated to reflux, nitrogen is bubbled through the solution during heat up and throughout the reaction. The combined monomers and initiator (azobisiso butylronitrile) is added to the refluxing solution evenly over a two-hour period. The initiator weight is 10 parts by weight per 1,000 parts by weight of vinyl monomers. The reaction solution is refluxed until the conversion of monomer to polymer is greater than 97 percent (8–16 hours).

In the second step, hydroquinone is added as an inhibitor and then methacrylic acid is added to react with the residual epoxy groups on the polymer. Triethyl amine is used as a catalyst. This esterification reaction is carried out at reflux temperatures until 80 percent esterification is accomplished (determined by residual acid number). The xylene is then removed by vacuum distillation and the polymer dissolved in methyl methacrylate so that the weight ratio of polymer to solvent is two.

EXAMPLE 8

The procedure of Example 6 is repeated except that the alpha-beta olefinically unsaturated resin is an epoxy resin prepared in the following manner: to a 2,000 ml., 3-neck flask equipped with stirrer, dropping funnel, thermometer and nitrogen inlet, is added 1 mole of 2,3-butanediol (91.12 parts by weight) and 4 moles of epichlorohydrin (370.0 parts by weight). The temperature is maintained at 110° C. while 2 moles sodium hydroxide (80.0 parts by weight) is added dropwise as a 30% aqueous solution. The rate of addition is regulated so that the reaction mixture remains neutral. After about 3 hours, the organic layer is separated, dried, distilled and a polymer is recovered. To 210 grams of this polymer are added 86 parts by weight of methacrylic acid containing 0.1 part by weight hydroquinone. While stirring in a nitrogen atmosphere, the mixture is heated to 140° C. for 20 minutes and then cooled to room temperature, i.e. 26° C.

EXAMPLE 9

The procedure of Example 8 is repeated except that the epoxy resin is prepared by reacting an epichlorohydrin-bisphenol epoxide with acrylic acid.

EXAMPLE 10

The procedures of the preceding examples is repeated except that the polysiloxane used to prepare the siloxane-unsaturated ester reaction product is a methoxylated partial hydrolysate of monophenyl and phenylmethyl silanes consisting essentially of dimethyltriphenyltrimethoxytrisiloxane and has the following typical properties:

| | |
|---|---|
| Average molecular weight | 470 |
| Combining weight | 155 |
| Specific gravity at 77° F. | 1.105 |
| Viscosity at 77° F., centistokes | 13 |

EXAMPLE 11

The procedures of Examples 1–10 are repeated except that the polysiloxane used to prepare the siloxane-unsaturated ester reaction product is dibutoxytetramethyldisiloxane.

EXAMPLE 12

The procedures of Examples 1–10 are repeated except that the polysiloxane used to prepare the siloxane-unsaturated ester reaction product is dipropoxytetramethylcyclotrisiloxane.

EXAMPLE 13

The procedures of Examples 1–10 are repeated except that the alpha-beta olefinically unsaturated siloxane is prepared from the following components in the manner hereinafter set forth:

| Reactants: | Parts by weight |
|---|---|
| Hydroxy functional cyclic siloxane [1] | 200 |
| Hydroxyethyl methacrylate | 71 |
| Hydroquinone | 0.1 |
| Xylene, solvent | 116 |

[1] A commercially available hydroxy functional, cyclic, polysiloxane having the following typical properties:

| Hydroxy content, Dean-Stark: | |
|---|---|
| percent condensible | 5.5 |
| percent free | 0.5 |
| Average molecular weight | 1600 |
| Combining weight | 400 |
| Refractive index | 1.531–1.539 |
| Softening point, Durran's Mercury Method, degrees F. | 200 |
| At 60% solids in xylene | |
| Specific gravity at 77° F. | 1.075 |
| Viscosity at 77° F., centipoises | 33 |
| Gardner-Holdt | A–1 |

A three neck flask fitted with a stirring motor, a thermometer, a nitrogen inlet and a Barrett trap is charged with the siloxane, the methacrylate, the xylene and the hydroquinone. This solution is heated to reflux, 138° C., over a 30-minute period. Nitrogen is bubbled into the reaction throughout the whole procedure. By-product water is slowly removed and the temperature gradually rises at 146° C. After 5 hours, 8.5 ml. of water is collected indicating nearly complete reaction. The xylene is removed by reduced pressure distillation and the product is then diluted to 70 percent non-volatile content with methyl methacrylate.

EXAMPLE 14

The procedures of Examples 1–13 are repeated except that in preparing the siloxane-unsaturated ester product an equivalent amount of 2-hydroxyethyl acrylate is substituted for the hydroxyethyl methacrylate.

EXAMPLE 15

The procedures of Examples 1–13 are repeated except that in preparing the siloxane-unsaturated ester product an equivalent amount of 2-hydroxypropyl methacrylate is substituted for the hydroxyethyl methacrylate.

EXAMPLE 16

The procedures of Examples 1–13 are repeated except that in preparing the siloxane-unsaturated ester product an equivalent amount of 2-hydroxybutyl acrylate is substituted for the hydroxyethyl methacrylate.

EXAMPLE 17

The procedures of Examples 1–13 are repeated except that in preparing the siloxane-unsaturated ester product an equivalent amount of 2-hydroxyoctyl acrylate is substituted for the hydroxyethyl methacrylate.

EXAMPLE 18

The procedures of Examples 1–13 are repeated except that in preparing the siloxane-unsaturated ester product an equivalent amount of 2-hydroxydodecanyl methacrylate is substituted for the hydroxyethyl methacrylate.

EXAMPLE 19

The procedures of Examples 1–13 are repeated except that in preparing the siloxane-unsaturated ester product an equivalent amount of 3-chloro-2-hydroxypropyl acrylate is substituted for the hydroxyethyl methacrylate.

EXAMPLE 20

The procedures of Examples 1–13 are repeated except that in preparing the siloxane-unsaturated ester product an equivalent amount of 3-acryloxy-2-hydroxypropyl methacrylate is substituted for the hydroxyethyl methacrylate.

EXAMPLE 21

The procedures of Examples 1–13 are repeated except that in preparing the siloxane-unsaturated ester product an equivalent amount of 3-acryloxy-2-hydroxypropyl methacrylate is substituted for the hydroxyethyl methacrylate.

EXAMPLE 22

The procedures of Examples 1–13 are repeater except that in preparing the siloxane-unsaturated ester product an equivalent amount of 3-crotonoxy-2-hydroxypropyl acrylate is substituted for the hydroxyethyl methacrylate.

EXAMPLE 23

The procedures of Examples 1–13 are repeated except that in preparing the siloxane-unsaturated ester product an equivalent amount of 3 - acryloxy-2-hydroxypropyl cinnamate is substituted for the hydroxyethyl methacrylate.

EXAMPLE 24

The procedures of Examples 1–13 are repeated except that in preparing the siloxane-unsaturated ester product an equivalent amount of 3-acryloxy-2-hydroxypropyl crotonate is substituted for the hydroxyethyl methacrylate.

EXAMPLE 25

The procedures of Examples 1–13 are repeated except that in preparing the diisocyanate-unsaturated ester product an equivalent amount of 2-hydroxyethyl acrylate is substituted for the hydroxyethyl methacrylate.

EXAMPLE 26

The procedures of Examples 1–13 are repeated except that in preparing the diisocyanate-unsaturated ester product an equivalent amount of 2-hydroxypropyl methacrylate is substituted for the hydroxyethyl methacrylate.

EXAMPLE 27

The procedures of Examples 1–13 are repeated except that in preparing the diisocyanate-unsaturated ester product an equivalent amount of 2-hydroxybutyl acrylate is substituted for the hydroxyethyl methacrylate.

EXAMPLE 28

The procedures of Examples 1–13 are repeated except that in preparing the diisocyanate-unsaturated ester product an equivalent amount of 2-hydroxyoctyl acrylate is substituted for the hydroxyethyl methacrylate.

EXAMPLE 29

The procedures of Examples 1–13 are repeated except that in preparing the diisocyanate-unsaturated ester product an equivalent amount of 2-hydroxydodecanyl methacrylate is substituted for the hydroxyethyl methacrylate.

EXAMPLE 30

The procedures of Examples 1–13 are repeated except that in preparing the diisocyanate-unsaturated ester product an equivalent amount of 3-chloro-2-hydroxypropyl acrylate is substituted for the hydroxyethyl methacrylate.

EXAMPLE 31

The procedures of Examples 1–13 are repeated except that in preparing the diisocyanate-unsaturated ester product an equivalent amount of 3-acryloxy-2-hydroxypropyl methacrylate is substituted for the hydroxyethyl methacrylate.

EXAMPLE 32

The procedures of Examples 1–13 are repeated except that in preparing the diisocyanate-unsaturated ester product an equivalent amount of 3 - crotonoxy - 2 - hydroxypropyl acrylate is substituted for the hydroxyethyl methacrylate.

EXAMPLE 33

The procedures of Examples 1–13 are repeated except that in preparing the diisocyanate-unsaturated ester product an equivalent amount of 3-acryloxy-2-hydroxypropyl cinnamate is substituted for the hydroxyethyl methacrylate.

EXAMPLE 34

The procedures of Examples 1–13 are repeated except that in preparing the diisocyanate-unsaturated ester product an equivalent amount of 3-acryloxy-2-hydroxypropyl crotonate is substituted for the hydroxyethyl methacrylate.

EXAMPLE 35

The procedures of Examples 1 and 13 are repeated except that hexamethylene diisocyanate is substituted for the tolylene diisocyanate.

EXAMPLE 36

The procedures of Examples 1–13 are repeated except that 1,3 xylylene diisocyanate is substituted for the tolylene diisocyanate.

EXAMPLE 37

The procedures of Examples 1–13 are repeated except that in the preparation of the alpha-beta olefincally unsaturated siloxane there is used an amount of the monohydroxy ester that is sufficient to react with at least one hydroxy or hydrocarbonoxy functional group of the siloxane but insufficient to react with all of such functional groups of the silioxane molecules in the reaction mixture.

EXAMPLE 38

The procedures of Examples 1–13 are repeated except that in the preparation of the alpha-beta olefinically unsaturated siloxane there is used an amount of the monohydroxy ester that is in excess of the amount required to satisfy all of the hydroxy and hydrocarbonoxy functional groups of the siloxane molecules in the reaction mixture.

EXAMPLE 39

The procedures of Examples 1 and 13 are repeated except that curing is effected with a beam potential of 175,000 volts with the workpiece 3 inches from the emitter and at 400,000 volts at 10 inches, each being in a nitrogen atmosphere containing minor amounts of carbon dioxide.

EXAMPLE 40

A paint is prepared by admixing 80 parts by weight of the siloxane-unsaturated ester product of Example 1, 80 parts by weight of the diisocyanate-unsaturated ester product of Example 1, 80 parts by weight of the vinyl monomer comprising resin of Example 7 and about 300 parts by weight methyl methacrylate. The resultant film-forming solution is applied to a metal substrate and crosslinked thereon with an electron beam in the manner of the preceding examples.

EXAMPLE 41

A paint is prepared by admixing 20 parts by weight of the siloxane-unsaturated ester product of Example 1, 20 parts by weight of the diisocyanate-unsaturated ester product of Example 1, 20 parts by weight of the polyester resin of Example 6, and about 10 parts by weight of methyl methacrylate. The resultant film-forming solution is applied to a metal substrate and crosslinked thereon with an electron beam in the manner of the preceding examples.

It will be understood by those skilled in the art that modifications can be made within the foregoing examples within the scope of the invention as hereinafter claimed:

I claim:

1. A radiation-curable paint which on a pigment, particulate filler and solvent-free basis consists essentially of (a) about 20 to about 80 parts by weight of an alpha-beta olefinically unsaturated siloxane formed by reacting one molar part of a siloxane having at least two functional groups selected from hydroxyl groups and hydrocarbonoxy groups with at least two molar parts of a hydroxyalkyl ester of an alpha-beta olefinically unsaturated monocarboxylic acid, and (b) about 80 to about 20 parts by weight of an alpha-beta olefinically unsaturated diurethane formed by reacting one molar part of an organic diisocyanate with two molar parts of a hydroxyalkyl ester of an alpha-beta olefinically unsaturated monocarboxylic acid.

2. A radiation-curable paint in accordance with claim 1 wherein said alpha-beta olefinically unsaturated siloxane is formed by reacting one molar part of a siloxane containing about 3 to about 18 silicon atoms per molecule and having at least two functional groups selected from hydroxyl groups and $C_1$–$C_4$ alkoxy groups, the remaining valences being satisfied by oxygen, hydrocarbon radical, hydrocarbonoxy radical, hydrogen or hydroxyl, with at least two molar parts of a hydroxyalkyl ester of acrylic or methacrylic acid.

3. A radiation-curable paint in accordance with claim 1 wherein said alpha-beta olefinically unsaturated diurethane is formed by reacting one molar part of an organic diisocyanate with two molar parts of a hydroxyalkyl ester of acrylic or methacrylic acid.

4. A radiation-curable paint in accordance with claim 1 which on a pigment, particulate filler and solvent-free basis comprises (a) about 30 to about 70 parts by weight of said alpha-beta olefinically unsaturated siloxane and (b) about 70 to about 30 parts by weight of said alpha-beta olefinically unsaturated diurethane.

5. A radiation-curable paint which on a pigment, particulate filler and fugitive solvent-free basis consists essentially of (a) about 10 to about 200 parts by weight vinyl monomers, (b) about 20 to about 80 parts by weight of an alpha-beta olefinically unsaturated siloxane formed by reacting one molar part of a siloxane having at least two functional groups selected from hydroxyl groups and hydrocarbonoxy groups with at least two molar parts of a hydroxyalkyl ester of an alpha-beta olefinically unsaturated monocarboxylic acid, and (c) about 20 to about 80 parts by weight of an alpha-beta olefinically unsaturated diurethane formed by reacting one molar part of an organic diisocyanate with two molar parts of a hydroxyalkyl ester of an alpha-beta olefinically unsaturated monocarboxylic acid.

6. A radiation-curable paint in accordance with claim 5 wherein said alpha-beta olefinically unsaturated siloxane is formed by reacting one molar part of a siloxane containing about 3 to about 18 silicon atoms per molecule and having at least two functional groups selected from hydroxyl groups and $C_1$–$C_4$ alkoxy groups, the remaining valences of the silicon atoms of said siloxane being satisfied by oxygen, hydrocarbon radical, hydrocarbonoxy radical, hydrogen or hydroxyl, with at least two molar parts of a hydroxylalkyl ester of acrylic or methacrylic acid.

7. A radiation-curable paint in accordance with claim 5 wherein said alpha-beta olefinically unsaturated diurethane is formed by reacting one molar part of an organic diisocyanate with two molar parts of a hydroxyalkyl ester of acrylic or methacrylic acid.

8. A radiation-curable paint in accordance with claim 5 which on a pigment, particulate filler and fugitive solvent-free basis comprises (a) about 20 to about 80 parts by weight of said vinyl monomers, (b) about 30 to about 70 parts by weight of said alpha-beta olefinically unsaturated siloxane, and (c) about 30 to about 70 parts by weight of said alpha-beta olefinically unsaturated diurethane.

9. A radiation-curable paint in accordance with claim 5 wherein said vinyl monomers are selected from esters of acrylic or methacrylic acid and a $C_1$–$C_8$ monohydric alcohol and $C_8$–$C_9$ monovinyl hydrocarbons.

10. In a radiation-curable paint comprising a film-forming solution of vinyl monomers and an alpha-beta olefinically unsaturated organic resin consisting essentially of carbon, hydrogen and oxygen and containing between about 0.5 and about 5.0 alpha-beta olefinic unsaturation units per 1,000 units molecular weight, the improvement wherein said paint also includes (a) an alpha-beta olefinically unsaturated siloxane formed by reacting one molar part of a siloxane having at least two functional groups selected from hydroxyl groups and hydrocarbonoxy groups with at least two molar parts of hydroxyalkyl ester of an alpha-beta olefinically unsaturated monocarboxylic acid, and (b) an alpha-beta olefinically unsaturated diurethane formed by reacting one molar part of an organic diisocyanate with two molar parts of a hydroxyalkyl ester of an alpha-beta olefinically unsaturated monocarboxylic acid, and said paint on a pigment, particulate filler and fugitive solvent-free basis consists essentially of (1) about 10 to about 300 parts by weight vinyl monomers, (2) about 20 to about 80 parts by weight of said alpha-beta olefinically unsaturated organic resin, (3) about 20 to about 80 parts by weight of said alpha-beta olefinically unsaturated siloxane, and (4) about 20 to about 80 parts by weight of said alpha-beta olefinically unsaturated diurethane.

11. A radiation-curable paint in accordance with claim 10 wherein said alpha-beta olefinically unsaturated organic resin is a polyester resin having between about 1 and about 3.5 units of alpha-beta olefinic unsaturation per 1,000 units molecular weight.

12. A radiation-curable paint in accordance with claim 10 wherein said alpha-beta olefinically unsaturated organic resin is a copolymer of vinyl monomers having between about 1 and about 3.5 units of alpha-beta olefinic unsaturation per 1,000 units molecular weight.

13. A radiation-curable paint in accordance with claim 10 wherein said alpha-beta olefinically unsaturated organic resin is formed by reacting a diepoxide with acrylic or methacrylic acid and contains between about 1 and about 3.5 units of alpha-beta olefinic unsaturation per 1,000 units molecular weight.

14. A radiation-curable paint in accordance with claim 10 where in said alpha-beta olefinically unsaturated siloxane is formed by reacting one molar part of a siloxane containing about 3 to about 18 silicon atoms per molecule and having at least two functional groups selected from hydroxyl groups and $C_1$-$C_4$ alkoxy groups, the remaining valences being satisfied by oxygen, hydrocarbon radical, hydrocarbonoxy radical, hydrogen or hydroxyl, with at least two molar parts of a hydroxyalkyl ester of acrylic or methacrylic acid.

15. A radiation-curable paint in accordance with claim 10 wherein said alpha-beta olefinically unsaturated diurethane is formed by reacting one molar part of an organic diisocyanate with two molar parts of hydroxyalkyl ester of acrylic or methacrylic acid.

16. A radiation-curable paint in accordance with claim 10 wherein said vinyl monomers are selected from esters of acrylic or methacrylic acid and a $C_1$-$C_8$ monohydric alcohol and $C_8$-$C_9$ monovinyl hydrocarbons.

17. In a radiation-curable paint comprising a film-forming solution of an alpha-beta olefinically unsaturated organic resin consisting essentially of carbon, hydrogen and oxygen and containing between about 0.5 and about 5.0 alpha-beta olefinic unsaturation units per 1,000 units molecular weight, the improvement wherein said paint also includes (a) an alpha-beta olefinically unsaturated siloxane formed by reacting one molar part of a siloxane having at least two functional groups selected from hydroxyl groups and hydrocarbonoxy groups with at least two molar parts of a hydroxyalkyl ester of an alpha-beta olefinically unsaturated monocarboxylic acid, and (b) an alpha-beta olefinically unsaturated diurethane formed by reacting one molar part of an organic diisocyanate with two molar parts of a hydroxyalkyl ester of an alpha-beta olefinically unsaturated monocarboxylic acid, and said paint on a pigment, particulate filler and fugitive solvent-free basis consists essentially of (1) about 20 to about 80 parts by weight of said alpha-beta olefinically unsaturated organic resin, (2) about 20 to about 80 parts by weight of said alpha-beta olefinically unsaturated siloxane, and (9) about 20 to about 80 parts by weight of said alpha-beta olefinically unsaturated diurethane.

18. An article of manufacture comprising a substrate and an adherent coating of paint on an external surface thereof, said coating comprising the in situ formed polymerization product of a paint which on a pigment, particulate filler and solvent-free basis consists essentially of (a) about 20 to about 80 parts by weight of an alpha-beta olefinically unsaturated siloxane formed by reacting one molar part of a siloxane having at least two functional groups selected from hydroxyl groups and hydrocarbonoxy groups with at least two molar parts of a hydroxyalkyl ester of an alpha-beta olefinically unsaturated monocarboxylic acid, and (b) about 80 to about 20 parts by weight of an alpha-beta olefinically unsaturated diurethane formed by reacting one molar part of an organic diisocyanate with two molar parts of a hydroxyalkyl ester of an alpha-beta olefinically unsaturated monocarboxylic acid, crosslinked by ionizing radiation.

19. An article of manufacture comprising a substrate and an adherent coating of paint on an external surface thereof, said coating comprising the in situ formed polymerization product of a paint which on a pigment, particulate filler and fugitive solvent-free basis consists essentially of (a) about 10 to about 200 parts by weight vinyl monomers, (b) about 20 to about 80 parts by weight of an alpha-beta olefinically unsaturated siloxane formed by reacting one molar part of a siloxane having at least two functional groups selected from hydroxyl groups and hydrocarbonoxy groups with at least two molar parts of a hydroxyalkyl ester of an alpha-beta olefinically unsaturated monocarboxylic acid, and (c) about 20 to about 80 parts by weight of an alpha-beta olefinically unsaturated diurethane formed by reacting one molar part of an organic diisocyanate with two molar parts of a hydroxyalkyl ester of an alpha-beta olefinically unsaturated monocarboxylic acid, crosslinked by ionizing radiation.

20. An article of manufacture comprising a substrate and an adherent coating of paint on an external surface thereof, said coating comprising the in situ formed polymerization product of a paint which on a pigment, particulate filler and fugitive solvent-free basis consists essentially of (a) about 10 to about 300 parts by weight vinyl monomers, (b) about 20 to about 80 parts by weight of an alpha-beta olefinically unsaturated organic resin consisting essentially of carbon, hydrogen and oxygen and containing between about 0.5 and about 5.0 alpha-beta olefinic unsaturation units per 1,000 units molecular weight, (c) about 20 to about 80 parts by weight of an alpha-beta olefinically unsaturated siloxane formed by reacting one molar part of a siloxane having at least two functional groups selected from hydroxy groups and hydrocarbonoxy groups with at least two molar parts of a hydroxyalkyl ester of an alpha-beta olefinically unsaturated monocarboxylic acid, and (d) about 20 to about 80 parts by weight of an alpha-beta olefinically unsaturated diurethane formed by reacting one molar part of an organic diisocyanate with two molar parts of a hydroxyalkyl ester of an alpha-beta olefinically unsaturated monocarboxylic acid, crosslinked by ionizing radiation.

21. An article of manufacture comprising a substrate and an adherent coating of paint on an external surface thereof, said coating comprising the in situ formed polymerization product of a paint which on a pigment, particulate filler and fugitive solvent-free basis consists essentially of (a) about 20 to about 80 parts by weight of an alpha-beta olefinically unsaturated organic resin consisting essentially of carbon, hydrogen and oxygen and containing between about 0.5 and about 5.0 alpha-beta olefinic unsaturation units per 1,000 units molecular weight, (b) about 20 to about 80 parts by weight of an alpha-beta olefinically unsaturated siloxane formed by reacting one molar part of a siloxane having at least two functional groups selected from hydroxyl groups and hydrocarbonoxy groups with at least two molar parts of a hydroxyalkyl ester of an alpha-beta olefinically unsaturated monocarboxylic acid, and (b) about 20 to about 80 parts by weight of an alpha-beta olefinically unsaturated diurethane formed by reacting one molar part of an organic diisocyanate with two molar parts of a hydroxyalkyl ester of an alpha-beta olefinically unsaturated monocarboxylic acid, crosslinked by ionizing radiation.

References Cited

UNITED STATES PATENTS

| 3,437,512 | 4/1969 | Burlant et al. | 260—827 |
| 3,437,513 | 4/1969 | Burlant et al. | 260—827 |

SAMUEL H. BLECH, Primary Examiner

U.S. Cl. X.R.

117—132BS, 138.8A, 148, 161ZA; 204—159.13; 260—32.8SB; 33.6SB, 41R, 46.5E, 47UA, 80.72, 482, 827